Jan. 31, 1961          G. B. THOMAS          2,969,841

DEVICE FOR FRACTURING FORMATIONS

Filed Dec. 26, 1956          3 Sheets-Sheet 1

INVENTOR.
GERALD B. THOMAS
BY Philip Sutrow
ATTORNEY

Jan. 31, 1961 G. B. THOMAS 2,969,841
DEVICE FOR FRACTURING FORMATIONS
Filed Dec. 26, 1956 3 Sheets-Sheet 2

INVENTOR.
GERALD B. THOMAS
BY Philip Subrow
ATTORNEY

Jan. 31, 1961 G. B. THOMAS 2,969,841
DEVICE FOR FRACTURING FORMATIONS
Filed Dec. 26, 1956 3 Sheets-Sheet 3

INVENTOR.
GERALD B. THOMAS
BY
ATTORNEY

United States Patent Office 2,969,841
Patented Jan. 31, 1961

2,969,841

DEVICE FOR FRACTURING FORMATIONS

Gerald B. Thomas, Los Angeles, Calif., assignor to Signal Oil and Gas Company, Los Angeles, Calif., a corporation of Delaware Filed Dec. 26, 1956, Ser. No. 630,576

10 Claims. (Cl. 166—243)

This invention relates to the fracturing of earth formations exposed by earth bores and particularly to devices and methods for inducing a fracture generally extending roughly in a plane along the axis of the bore.

The art of introducing fractures into formations to increase their permeability is now a well developed commercial procedure used extensively in oil field practice.

The advantage of introducing a vertical fracture as compared with a horizontal fracture or a fracture along the contact between earth formations is familiar to those skilled in this art. For purposes of clarity the term "vertical fracture" as employed herein is generally intended to denote a fracture which is substantially in a plane passing through the longitudinal axis of the well bore and which cuts across or is transverse to the bedding planes of the formation penetrated. Also, the term "horizontal fracture" is intended to denote a fracture generally in a plane perpendicular to the axis of the well bore and following a bedding plane of the formation penetrated. However, it will be understood that the bedding planes in certain instances may be oblique to the penetrating well bore through variation of the well bore from vertical, or through the inclination of the bedding planes from a true horizontal position. Said vertical fractures thus intersect permeability barriers and facilitate migration of fluids from the formation to the well bore.

One of the difficulties has been that horizontal fracturing and fractures along the contact plane occur readily and any method for introducing a vertical fracture results instead in a fracture which in its practical effect is a horizontal fracture. Additionally, since most formations, there are central zones of fracture or weakness, whose direction with respect to the bore axis is unknown, any fractures resulting from prior art methods employing hydraulic pressure are largely uncontrollable by nature. The direction and extent of fractures generated by such conventional fracturing methods are generally not determinable in advance of actual fracture since all of the various physical factors, e.g., directional rock strength, compressive or tectonic stresses and the applied stresses are not known in advance. Further, in such prior art processes the orientation of the fracture obtained through normal fracture techniques is not controllable from the surface.

Another difficulty encountered in such prior art conventional fracturing of well formations is that it cannot be determined generally just when the fracture is formed, and after the fracture is generated, a problem of maintaining the fracture open while propping material is introduced into the fracture also presents itself.

One object of this invention is the provision of procedure and apparatus which permits orientation of the fracture to be generated in an earth formation adjacent a well bore.

Another object is to provide a process and apparatus for readily determining just when the fracture has been generated.

A still further object is to afford procedure and apparatus for maintaining the fracture open while sand or other propping material is introduced into the fracture, without removing the tool from the well bore.

Yet another object is to design a tool for the aforementioned purpose and including means to facilitate lifting the tool to the surface of the well bore.

In the procedure of my invention, I produce a fracture, e.g., a vertical fracture, by introducing a localized hoop or circumferential stress in the formation sufficient to introduce a vertical fracture. This I accomplish by introducing opposed radial forces against localized areas of the formation and when the fracture is developed, I maintain the forces to hold the fracture open and introduce propping means to fill the fracture and hold it open, said propping means being permeable to fluid flow. I may then either maintain the radial forces or release them and rely on the propping means to prevent the relaxation of the formation and the sealing of the fracture.

I accomplish this result by introducing a tool which creates an orientable radial force, and preferably opposed radial forces, against a localized area of the formation uniformly at a chosen longitudinal section of the bore hole. The radial force or each of the opposed radial forces is applied against a peripheral portion or area less than 180° about the wall of the bore. Application of the opposed radial forces generates a circumferential shear stress producing a fracture in a localized area between the opposed radial forces. The radial forces may be initially oriented and the resulting shear stress is sufficient to create a fracture generally extending longitudinally of the bore hole. This wedging action produced by the radial forces may be preferably accomplished by hydraulic means. When a fracture occurs a signal is received at the surface reporting the creation of a fracture. I may then, while maintaining the radial pressure to prevent the relaxation of the formation, pump into the bore propping material which will pass into the fracture to hold the fracture open. The radial pressure may then either be maintained or relaxed.

I may if desired orient these generally vertical fractures so that they are in the desired position in the azimuth plane and may locate them at any desired position in the bore hole. I may create a number of these fractures at various positions in the bore hole as desired.

These and other objects of my invention will be further described in connection with the drawings, in which.

In order to prepare the well for fracturing employing the techniques of my invention, it will be found desirable to drill or core the formation at the desired depth where the fracture is to be formed in such fashion as to establish a bore of the desired diameter and roundness. The tool is then run into the formation to the desired depth, orienting it in the bore so that the fracture is established in the quadrants desired.

Liquid under pressure may be introduced into the tubing on which the tool is suspended. As pressure is increased, the bag section or longitudinal bladders carried on the tool expand into contact with opposite sides of the well bore. Increases in pressure within the tool result in increased radial forces, with increased circumferential localized stresses set up in opposite directions. The hydraulic pressures within the tool can be continually increased until the circumferentially imposed stresses exceed the combined strength of the rock and the compressive tectonic forces present, at which time the formation will rupture usually in an approximate vertical direction longitudinally of the bladders. Once rupture is achieved and there has been a parting movement of the formation, this is signalled at the surface through a change in the internal pressure in the tool or in the flow rate of the fluid passing into the annulus, indicating occurrence of a fracture.

When the formation has been fractured, a fluid containing suspended sand or other propping material can be introduced into the annulus of the well bore to prop the fracture in position, which fluid with entrained solids can be pumped away into the formation via the fracture generated by the tool. During this period it may be advantageous to maintain a higher fluid pressure within the tool than in the annulus.

When the propping operation is completed, the pressure in the tool and the annulus is removed and the tool may be moved to a new location. This is conveniently accomplished by providing the device with a standing valve, preferably removable, to permit drainage of fluid from the tool and thus facilitate lifting it to the surface.

While the procedure and use of the tool of the invention often result in generation of a vertical fracture as defined above, it is to be understood that the invention is not limited to generation of vertical fractures. Thus, where the bedding plane is not horizontal, but rather is inclined at an angle and/or the well bore is deviated rather than vertical, the fracture may not extend vertically but may be inclined at an angle to the vertical, and such fracture may not extend in a plane along the axis of the bore, but the plane of such fracture may be disposed at an angle to the well bore, e.g., along an inclined fault line. In any event the fractures produced according to the invention intersect permeability barriers and facilitate migration of fluids from the formation to the well bore.

Figure 1:
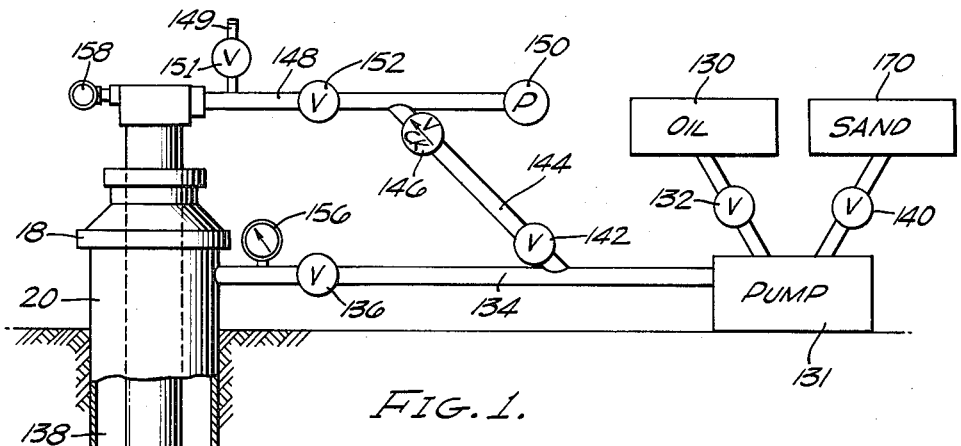
Fig. 1 is an elevational view of a novel tool for producing fractures, preferably vertical fractures, according to the invention.

Referring to Fig. 1 of the drawing, the tool for producing fractures according to the invention is composed essentially of two sections, an upper fracturing section 10 and a lower circulating section 12, both sections being supported in a cored well bore 16 by a length of tubing 14 supported from the casing head 18. The well bore 16 is shown with casing 20 lining the bore, the casing being cemented at its lower end with a casing shoe 22.

Figure 7:
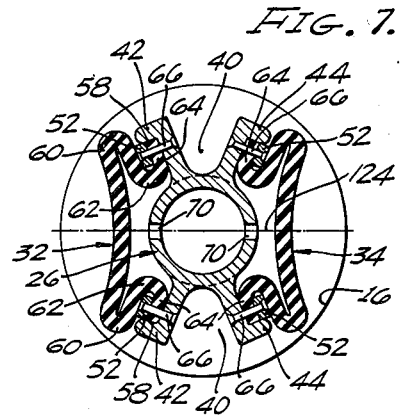
Fig. 7 is a horizontal section taken on line 7—7 of Fig. 3.

The tube 14 is threaded at its lower end 24 (see Fig. 3) onto another relatively short length of tubing 26 within the fracturing section 10 of the tool. Tube 26 carries integral therewith and at opposite ends thereof, upper and lower caps 28 and 30, to which are connected the opposite ends of a pair of flexible bladders or packers 32 and 34 positioned on opposite sides of tube 26 (note also Fig. 7). These bladders extend longitudinally along tube 26, and in their collapsed position as seen in Fig. 7, they each assume an arcuate section concave inwardly toward tube 26 and out of contact with the wall of the bore 16. The bladders 32 and 34 can be constructed of any suitable flexible material such as rubber, which is able to withstand relatively high pressures during expansion of the bladders against the well bore, as described below, without rupture. If desired, the rubber bladders may be reinforced, for example, by means of steel straps vulcanized longitudinally within the bladder.

Figure 5:
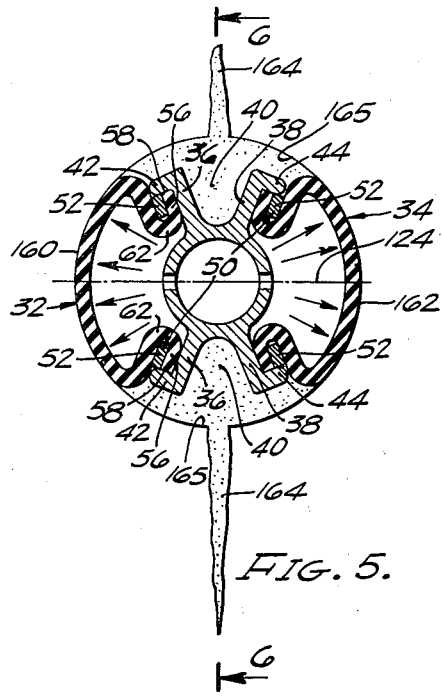
Fig. 5 is a horizontal section taken on line 5—5 of Fig. 4.

As seen in Figs. 5 and 7, tube 26 carries two pairs of integral longitudinally extending support arms 36 and 38, each of said arms extending radially outward from tube 26. The arms 36 form an angle somewhat less than 180° between each other, and the arms 38 mounted symmetrically opposite arms 36 on tube 26, likewise form an angle somewhat less than 180° with each other, leaving longitudinally extending spaces 40 between adjacent arms 36 and 38. Arms 36 each have a short integral flanged end portion 42 disposed at an angle of about 90° to the arms, said end portions 42 extending in a generally arcuate direction toward arms 36. Arms 38 carry similar integral flanged end portions 44.

Figure 8:
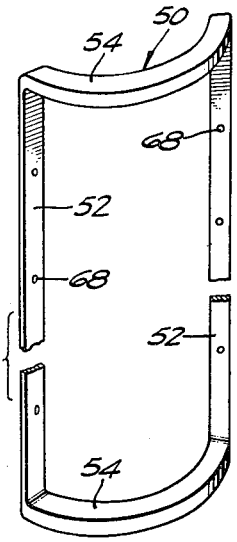
Fig. 8 is an element of the tool structure.
Figure 3:
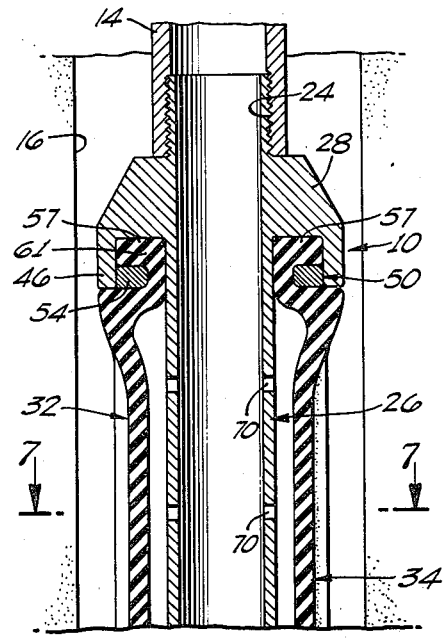
Fig. 3 is a partial vertical section of the upper portion of my tool, taken on line 3—3 of Fig. 1, with the flexible bladder shown in collapsed position.
Figure 3:
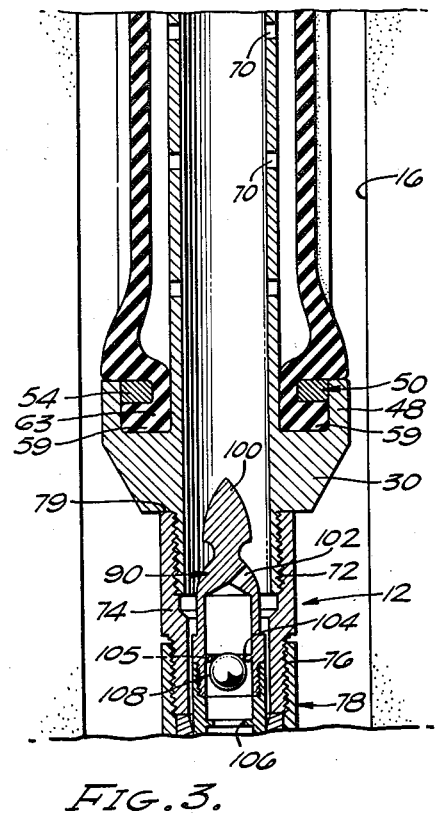

Cap 28, viewing Fig. 3, carries a downwardly extending outer integral flange 46 and cap 30 carries an upwardly extending outer integral flange 48. A retainer 50 (see Fig. 8) having a pair of vertical legs 52 of a length approximately equal to the vertical distance between flanges 46 and 48, and a pair of arcuate bridges 54 connecting said legs at opposite ends thereof, is adapted to be supported adjacent the lower end of the inner periphery of flange 46 (see Fig. 3) and adjacent the upper end of the inner periphery of flange 48. The arcuate bridges 54 of retainer 50 are positioned between arms 36, the arcs formed by said bridges each subtending an angle of a size such that the vertically extending legs 52 of said retainer are disposed substantially in contact with the inner periphery of the opposite flanges 42 adjacent their ends, with said legs 52 spaced a short distance from the adjacent arms 36, as indicated at 56.

A second similar retainer structure 50 is mounted on the opposite sides of flanges 46 and 48 of caps 28 and 30, and between the arms 38, as indicated in Fig. 3.

Rubber bladders 32 and 34 are each in the form of a longitudinally extending rubber sheet which is bent into the position shown in Figs. 3 and 7 and held in such position by a retainer 50. This is accomplished, say with respect to bladder 32, by first placing the opposite ends 57 and 59 of the bladder in the end spaces formed between the interior surface of cap 28 and flange 46, and between the interior surface of cap 30 and flange 48. The retainer 50 is then forced inwardly against the bladder and the bladder folded until it is in the position described above, with the retainer maintained against outward movement by contact of the arcuate bridges 54 with flanges 46 and 48, and by contact of the legs 52 of the retainer with the inner surfaces of end flanges 42 of the arms 36.

When the rubber bladder 32 is thus forced into position by retainer 50 it will be noted, as seen in Fig. 3, that the upper end 57 of the bladder is clamped in the space 61 defined by the upper arcuate bridge 54 of retainer 50, the outer wall of tube 26 and the inside surfaces of cap 28 and flange 46 thereof. Likewise, the lower end 59 of the bladder 32 is clamped in a space 63 defined by the lower arcuate bridge 54 of the retainer 50, the outer wall of tube 26, and the inner surfaces of cap 30 and flange 48. In this manner the opposite ends of the bladder 32 are closed by the caps 28 and 30.

As seen in Fig. 7, placement of retainer 50 in position against the bladder 32 causes the bladder to bend inwardly at intermediate spaced points to form longitudinally extending bends 60, and at an intermediate point between bends 60 and the outer edges 58 of the bladder, the bladder is forced to bend back in the opposite direction at 62 over the inner portion of the vertical legs 52 of the retainer, with the outer side portions 64 of the bladder clamped in spaces 56 between said legs and the adjacent arms 36. The side portions 64 of the bladder are held in fixed position by a plurality of fasteners or studs 66 spaced vertically along arms 36, and passing through said arms, side portions 64 of the bladder, and apertures 68 in the vertical legs 52 of retainer 50. Thus, the outer edges of bladder 32 are enclosed and secured by arms 36, flanges 42 and the retainer legs 52.

In the same manner as described above, bladder 34, which is of the same material, size and shape as bladder 32, is forced into position by a second retainer 50. Thus, the opposite ends 57 and 59 of bladder 34 are enclosed in caps 28 and 30, and the outer side portions 64 of bladder 34 are enclosed and clamped by arms 38, flanges 44 and the legs 52 of said second retainer 50, and maintained in position by fasteners 66 similar to those employed for clamping bladder 32.

Figure 4:
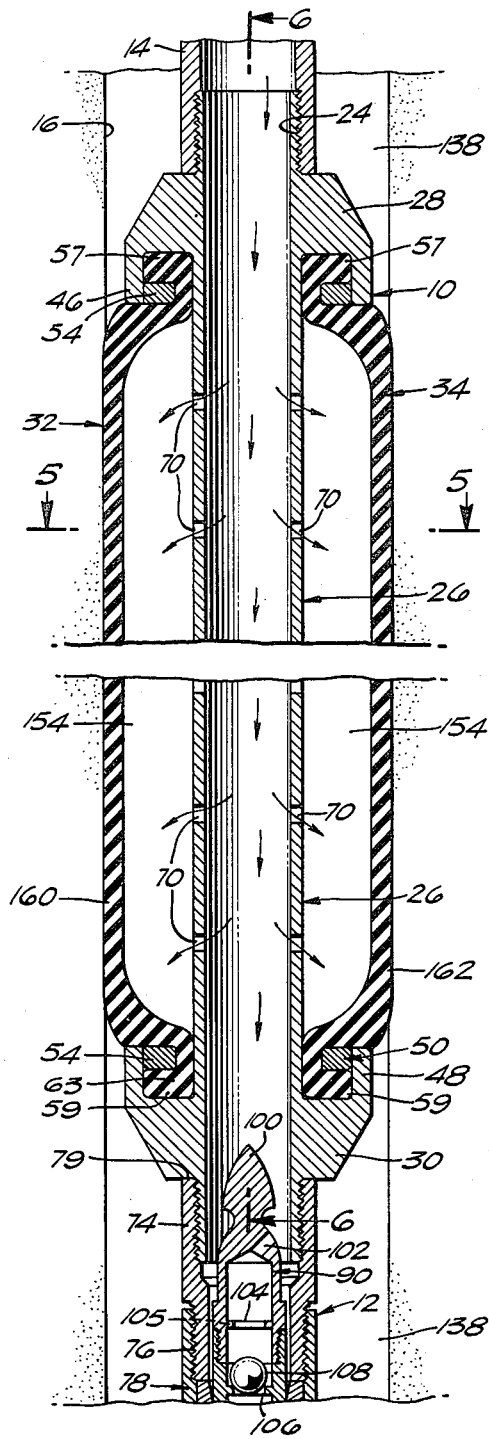
Fig. 4 is a view similar to Fig. 3, but showing the flexible bladder in expanded position.

Tube 26, viewing Figs. 3 and 4, is perforated to form a series of ports 70 distributed along the length of the tube and diametrically opposite each other, said ports communicating with the interior of bladders 32 and 34. It will be seen then that pressure fluid passing downwardly through tubes 14 and 26, as indicated by the arrows in Fig. 4, will pass through ports 70 into both bladders, causing them to expand into contact with the adjacent peripheral portions of the wall of bore 16, as seen in Fig. 5, and to exert pressure against such wall portions, as described more fully hereinafter.

Figure 2:
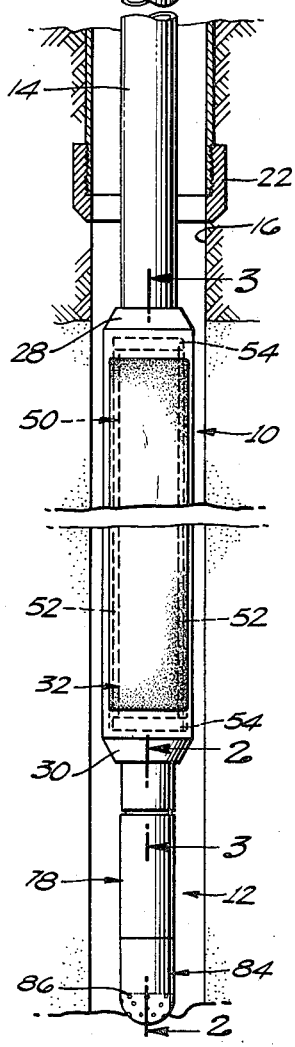
Fig. 2 is a partial vertical section of the lower end of said tool, taken on line 2—2 of Fig. 1.
Figure 2:
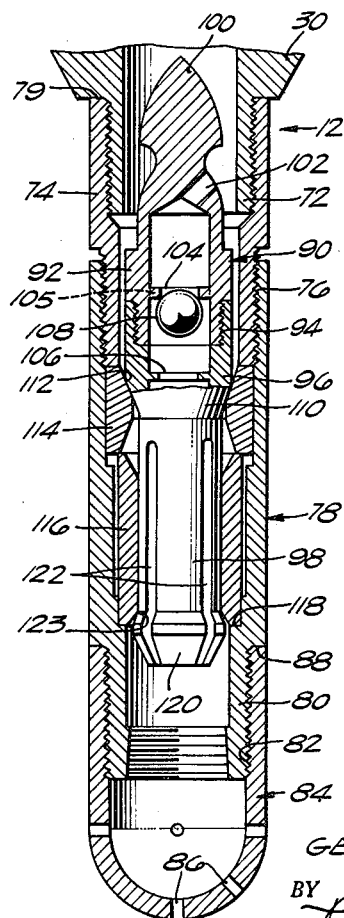

Tube 26 has a lower depending end 72 below cap 30, said end being threaded into a collar 74, the lower end of which is externally threaded at 76 and threadably engages a generally cylindrical hollow body member 78 (see Fig. 2). The upper end of collar 72 abuts the lower surface of cap 30 at 79. Body member 78 has a depending flange 80 which is externally threaded for engagement with internal threads 82 at the upper end of a hollow plug 84 having a series of circulating ports 86 in the lower end thereof. The upper open end of plug 84 abuts a shoulder 88 on body member 78 adjacent the top of flange 80.

Within members 72, 74 and 78 is a standing valve indicated generally by the numeral 90. The valve comprises an upper valve housing member 92 which threadably engages at its lower end indicated at 94, a lower valve housing member 96 having an integral depending hollow seating shoe 98. Valve housing member 92 has integral with its upper end a spear head 100 for receiving a wire line tool to raise or remove the valve from the tool as described more fully below. A port 102 connects the interior of tube 26 with the interior of the upper valve housing 92. Within the upper valve housing member 92 is a spider type valve seat 104 having a plurality of peripheral openings 105 therein, and spaced from valve seat 104 directly below it in the lower valve housing member 96 is a second valve seat 106, said seats being adapted to receive a ball 108.

The lower portion of the valve housing member 96 is tapered downwardly at 110 and is thus held in vertical position by engagement with a similarly tapered portion 112 of a retaining ring 114. The lower end of ring 114 rests on the upper end of a sleeve 116, the lower end of which rests on a shoulder 118 on the interior wall of body member 78. It will be seen that the seating shoe 98 has an enlarged end portion 120 and that a series of longitudinally extending slots 122 are formed in shoe 98 to provide the shoe with a spring action. Thus, in assembling the device, shoe 98 is shoved down through sleeve 116, with the enlarged lower end 120 of the shoe forced inwardly under tension. When the enlarged portion 120 has cleared the lower end of sleeve 116, said enlarged portion springs outwardly into normal position as seen in Fig. 2, with the upper end of enlarged portion 120 abutting the shoulder 123 at the lower end of sleeve 116, thus providing a wedging action, preventing upward movement of seating shoe 98 and hence of valve 90. When shoe 98 is in this position, the tapered portion 110 of the lower valve housing 96 is in contact with the adjacent tapered portion 112 of ring 114, providing a wedging action preventing further downward movement of valve 90 and shoe 98. Thus, the valve 90 is securely locked in position against axial displacement in the tool.

The portion of my tool described above and shown in Fig. 2, including element 74, body member 78, plug 84, and the standing valve 90 with its associated elements housed in members 74 and 78, constitute the circulating section 12 of the tool, which prevents by-passing of fluid down tube 26 beyond bladders 32 and 34 and out the lower end of the tube during the fracturing operation, but permits fluid flow upwardly from the interior of body member 78 into tube 26, such structure being particularly adapted to aid in circulating or raising the tool after a fracturing operation is completed.

In operation, the tool is run into the bore 16 until the fracturing element 10 thereof is positioned below the casing shoe 22. The tool is then oriented by rotation thereof so as to place the flexible bags or bladders 32 and 34 in the proper position to produce a fracture or fractures in the desired quadrant, as seen in Fig. 5, said fractures occurring between the bladders in a direction or plane generally perpendicular to a line 124 joining the midpoints of bladders 32 and 34 along a diameter of tube 26.

A fluid medium suitable for carrying the propping agent, and which may be a crude or refined petroleum fraction contained in a tank 130 (see Fig. 1) is then pumped by pump 131 via valve 132 through line 134 and valve 136 into the annulus 138 between the well bore and the tool, valve 140 being maintained closed. During this time, valve 142 is open, and a portion of the oil in line 134 passes via line 144 and check valve 146 into line 148, and is introduced via valve 152 into tubes 14 and 26 of the tool. When the tubes 14 and 26, and the annulus 138 have been filled with fluid, as indicated by the level of the fluid in vent pipe 149, valves 151 and 136 are closed, and the pressure of the oil in line 148 and tubes 14 and 26 is increased by a booster pump 150.

This causes additional liquid to pass from tube 26 through ports 70 into the interior 154 (see Fig. 4) of the bladders 32 and 34. Since the pressure in tubes 14 and 26 is higher than that in annular space 138, ball 108 of valve 90 is forced against the lower valve seat 106, closing off communication between tube 26 and the interior of valve body 78. As this differential pressure builds up, the bladders 32 and 34 are caused to expand against the adjacent wall portions of the bore 16, as seen in Figs. 4 and 5, until a major portion of the outer surface of both bladders is pressed against the wall of the bore. It will be seen in Fig. 5 that each of portions 160 and 162 of the respective bladders contacts less than 180° of the peripheral area of the well bore 16.

Figure 6:
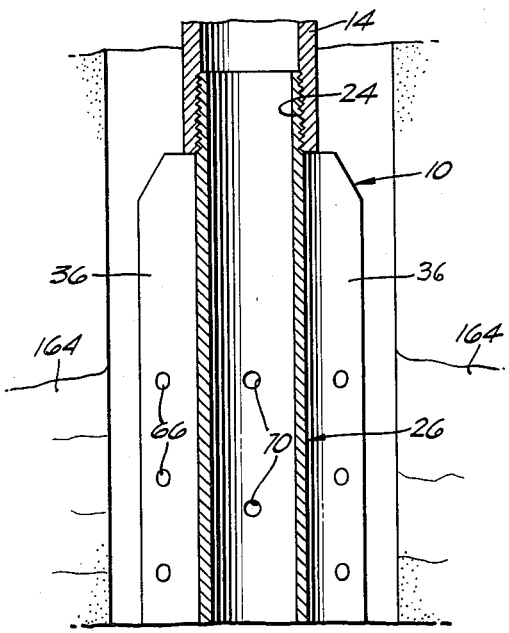
Fig. 6 is a vertical section taken on line 6—6 of Figs. 4 and 5.
Figure 6:
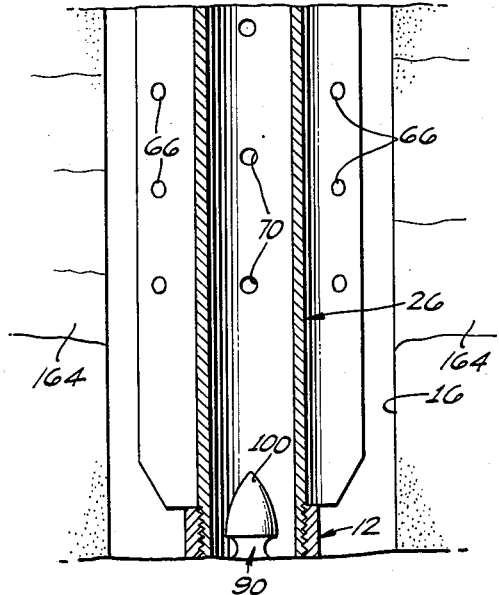

A differential pressure, say for example 500 to 1000 pounds per square inch, may thus be generated and maintained between the inside and outside of the tool, as indicated by gages 156 and 158. During this period, the portions 160 and 162 of the bladders, which are in direct contact with the bore wall, apply pressure to the formation in the form of radial horizontal forces as indicated by the arrows in Fig. 5. These forces apply a circumferential stress about the periphery of the well bore 16, and when such stress is sufficient, it will cause a rupture or ruptures indicated at 164 (see Figs. 5 and 6) in a plane extending substantially along or parallel to the axis of the bore and perpendicular to the applied forces, assuming that the bedding planes between formations are substantially horizontal, the well bore is vertical and the rock formation is substantially homogeneous. It will be seen that the fractures 164 under such conditions are substantially vertical and are formed along the portions 165 of the well bore between the bladders, said wall portions being placed under great tension by the applied forces. It is noted particularly that my tool applies horizontal forces, that is, in a plane perpendicular to the axis of the bore, and not vertical forces, to the formation, and that the fractures occur when the applied stresses overcome the existing horizontal stresses within the rock body and located in the same direction as the applied forces, plus the force necessary to exceed the natural cohesive strength of the rock itself. The production of fractures 164 may be signaled by a flow of liquid from annulus 138 and into the spaces 40 communicating with the fractures, and further indicated by the lowering of pressure in the annulus, which is registered by gage 156.

It will be understood that one fracture or a number of such fractures 164 can be formed, said fractures being more or less in alignment, e.g., along the axis of the bore. Further, in certain instances, e.g., where the rock is not homogeneous and fault lines occur, the fractures may not be in alignment, and may also not be in a plane passing through the axis of the bore. Also, instead of employing a pair of bladders or packers 32 and 34, I may employ a single bladder such as 32. In the latter case, pressure will be applied by horizontal forces against only one side wall portion, say 160 or 162, of the well bore, instead of against opposite side wall portions, but substantially the same results are obtained as noted above with respect to application of opposed radial forces and generation of circumferential stresses to produce a fracture in the well bore at a place spaced from such forces. Where only one bladder is employed a portion of the opposite wall of the tool, e.g. an opposite arcuate wall portion of the tube 26, will abut a portion of the bore wall to apply a reactive force opposing the force applied by the single bladder. However, the fracture or fractures are formed more rapidly and more efficiently according to the invention by employing a pair of oppositely positioned flexible bag sections or bladders as shown in the drawing and described above, and this is the preferred practice.

As the fracture forms, the radial pressure against the formation can be maintained by keeping the bladders in contact with the walls of the formation by the pressure continued to be generated by the fluid in tube 26. On generation of the fracture, valve 142 is closed and valves 136 and 140 are opened, and a mixture of the oil from tank 130 and sand from receptacle 170 is then pumped by means of pump 131 through line 134 into the annulus 138 and spaces 40, and into the fractures 164, which are maintained open by the radial pressure continued to be exerted by packers 32 and 34 against the formation. During this period, pump 150 may be shut off and valve 152 closed, and the fluid held in bladders 32 and 34 will maintain the bladders in expanded position. The sand in the oil-sand mixture fills the fractures and props them in position, preventing their closing when the radial pressure exerted by the packers is released. If desired, as soon as the oil-sand mixture commences to flow into the fractures, the radial pressure of the packers against the bore hole wall may be released, but preferably I maintain this radial pressure while the oil-sand mixture is being pumped into the fractures.

When the pressure of the oil-sand mixture in annulus 138 increases as shown by gage 156, this indicates that the propping material, i.e., the sand, is filling the fractures, and when a substantial pressure increase is thus obtained, this indicates the operation is complete, and that the fractures have been sufficiently propped by the sand to remain open on removal of the radial forces against the well bore and on discontinuing of the pumping of the oil-sand mixture into annulus 138. Valve 151 is opened to open pipe 149 to the atmosphere, and the fluid in annulus 138 and in the plug 84 and body member 78 force ball 108 against the upper valve seat 104, causing fluid from annulus 138 and plug 84 to enter tubes 26 and 14 via the valve openings 105 adjacent valve seat 104. A wire line is then attached to spearhead 100 and the valve 90 is pulled loose of the valve body 78, the enlarged end 120 of the seating shoe 78 contracting so as to pass through the sleeve 116 as the valve is lifted upward out of the tool, the opening of the valve 90 as described above facilitating lifting of the valve through the head of liquid in tubes 26 and 14. The valve 90 is then withdrawn through tubes 26 and 14. Thereafter, pump 131 is shut off, and the bladders 32 and 34 collapse, and the remainder of the tool may then be raised to the surface. During this operation, the fluid in tubes 26 and 14 passes through ports 86 of plug 84, thus facilitating raising of the device without at the same time lifting the fluid in tubes 26 and 14.

From the foregoing it is seen that I have developed a novel and efficient procedure for producing a fracture, e.g., a vertical fracture, in a well bore, involving the application of radial forces to the wall of the bore and generation of circumferential stresses about the periphery of a section of the well bore. The procedure includes maintenance of the fracture in open position and introduction of propping material such as sand into the fracture so that the fracture remains open and permeable to fluid flow from the formation into the well bore. I have also designed a novel tool for carrying out my process, including bag sections or packers which apply the radial forces to the well bore, and means for circulating or manipulating the tool in the bore hole to move the tool to another position in the well bore, or to raise the tool to the surface of the well bore.

It will be seen that the invention possesses several advantages over conventional fracturing operations and techniques. Thus, according to the invention, the radial forces may be oriented from the surface of the well to thus orient the resulting fractures in the desired quadrant or quadrants. My procedure and device generally enables the operator to know precisely when the fracture occurs. The radial forces can be maintained after the fracture is generated to hold the fracture open, and propping material can be introduced into the fracture while maintaining the fracture open. Introduction of the propping material into the fracture can be accomplished while the tool remains in the well bore. Following the propping of the fracture, the tool can be readily removed. The fracture produced according to the invention principles is often a vertical fracture or one transverse to the bedding planes between rock formations, which are highly desirable for improving permeability and flow rate of fluids from the formation into the well bore.

While I have described a particular embodiment of my invention for the purpose of illustration, it should be understood that various modifications and adaptations thereof may be made within the spirit of the invention as set forth in the appended claims.

I claim:

1. A formation fracturing device adapted to be inserted in a well bore, which comprises a tube, a flexible bladder mounted about an arcuate portion less than 180° of the outer periphery of said tube, ports in said tube communicating with said bladder, and means closing one end of said tube, said bladder being expandable into pressure contact with an arcuate portion of the wall of said bore by passage of fluid through said tube and into said bladder, and adapted to provide a space externally of said tube adjacent said bladder between the tube and well bore for free passage of fluid in said space.

2. A formation fracturing device adapted to be inserted in a well bore, which comprises a tube, a longitudinally extending flexible bag mounted about an arcuate portion less than 180° of the outer periphery of said tube, ports in said tube communicating with said bag, and a valve closing one end of said tube, said bag being expandable into pressure contact with only an arcuate portion of the wall of said bore by passage of fluid through said tube and into said bag, and adapted to provide a space externally of said tube adjacent said bag between the tube and well bore for free passage of fluid in said space.

3. A formation fracturing device adapted to be inserted in a well bore, which comprises a tube, a pair of flexible bladders each mounted about a separate arcuate portion of the outer periphery of said tube, said bladders being spaced peripherally from each other, ports in said tube communicating with the interior of each of said bladders, and means closing one end of said tube, said bladders being expandable into pressure contact with separate spaced peripheral portions of the wall of said bore by passage of fluid through said tube and into said bladders, and adapted to leave a space between adjacent sides of said bladders externally thereof and adapted to provide a space externally of said tube adjacent said bag between the tube and well bore for free passage of fluid in said space.

4. A formation fracturing device adapted to be inserted in a well bore, which comprises a tube, a pair of longitudinally extending flexible bags each mounted at diagonally opposite positions about a separate arcuate portion of the outer periphery of said tube, said bags being spaced peripherally from each other, ports in said tube communicating with the interior of each of said bags, and a standing valve closing one end of said tube, said bags being expandable into pressure contact with separate spaced peripheral portions of the wall of said bore by passage of fluid through said tube and into said bags, and adapted to leave a space between adjacent sides of said bags externally thereof and between the external wall of said tube and said well bore for free passage of fluid in said space.

5. A formation fracturing device adapted to be inserted in a well bore, which comprises a tube, a pair of longitudinally extending flexible bags each mounted at diagonally opposite positions about a separate arcuate portion of the outer periphery of said tube, said bags being spaced peripherally from each other, ports in said tube communicating with the interior of each of said bags, a perforated plug at the lower end of said tube, and a standing valve in said tube adjacent said plug, said valve normally closing one end of such tube and being removable, said bags being expandable into pressure contact with separate spaced peripheral portions of the wall of said bore by passage of fluid through said tube and into said bags, and adapted to leave a space between adjacent sides of said bags externally thereof and between the external wall of said tube and said well bore for free passage of fluid in said space.

6. A formation fracturing device adapted to be inserted in a well bore, which comprises a tube, a longitudinally extending flexible bladder mounted about an arcuate portion less than 180° of the outer periphery of said tube, said bladder having upper and lower ends and opposite sides, retaining means for securing the ends and sides of said bladder in closed position on said tube, ports in said tube communicating with said bladder, a standing valve closing one end of said tube, said bladder being expandable into pressure contact with an arcuate portion of the wall of said bore by passage of fluid through said tube and into said bladder, and adapted to provide a space externally of said tube adjacent said bladder between the tube and well bore for free passage of fluid in said space.

7. A formation fracturing device adapted to be inserted in a well bore, which comprises a tube, a longitudinally extending flexible bladder mounted about an arcuate portion less than 180° of the outer periphery of said tube, said bladder having upper and lower ends and opposite sides, bladder supporting means on said tube, and a retainer member cooperating with said supporting means for securing the ends and sides of said bladder in closed position on said tube, ports in said tube communicating with said bladder, a standing valve closing the lower end of said tube, said bladder being expandable into pressure contact with only an arcuate portion of the wall of said bore by passage of fluid down said tube and into said bladder and adapted to provide a space externally of said tube adjacent said bladder between the tube and well bore for free passage of fluid in said space.

8. A formation fracturing device adapted to be inserted in a well bore, which comprises a tube, a pair of longitudinally extending flexible bags each mounted at opposite positions about a separate arcuate portion of the outer periphery of said tube, said bags being spaced peripherally from each other, each said bag having upper and lower ends and opposite sides, means on said tube for supporting each of said bags, a retainer member for each of said bags cooperating with said supporting means for securing the ends and sides of said bags in closed position about said tube, ports in said tube communicating with the interior of each of said bags, a standing valve normally closing said tube near the lower end thereof, a perforated plug connected to the lower end of said tube just below said valve, said valve being adapted to permit upward flow of fluid into said tube from the lower end thereof, said valve being removable through said tube, said bags being expandable into pressure contact with separate spaced peripheral portions of the wall of said bore by passage of fluid down said tube and into said bags, and adapted to leave a space between adjacent sides of said bags externally thereof and between the external wall of said tube and said well bore for free passage of fluid in said space.

9. A formation fracturing device adapted to be inserted in a well bore, which comprises a tube, a longitudinally extending flexible bladder mounted about only a portion of the outer periphery of said tube, said bladder having upper and lower ends and opposite sides, opposed spaced flanges connected to the outer surface of said tube longitudinally thereof, spaced radial arms connected to the outer surface of said tube between said flanges, a retainer member having vertically extending legs and arcuately shaped end portions connecting said legs, said retainer member being positioned longitudinally of said tube with said end portions positioned within said opposed flanges and said vertical legs disposed within said radial arms and adjacent thereto, the ends of said bladder being clamped and secured in closed position between said flanges and said end portions of said retainer member, and the sides of said bladder being clamped and secured in closed position between said radial members and the adjacent vertical legs of said retainer member, ports in said tube communicating with the interior of said bladder, a standing valve closing the lower end of said tube, said bladder being expandable into pressure contact with only a peripheral portion of the wall of said bore hole by passage of fluid down said tube and into said bladder, and adapted to leave a space externally of said bladder and adjacent thereto and between the external wall of said tube and said well bore for free passage of fluid in said space.

10. A formation fracturing device adapted to be inserted in a well bore, which comprises a tube, a pair of longitudinally extending flexible bladders mounted at diagonally opposite positions about separate arcuate portions of the outer periphery of said tube, said bags being spaced peripherally from each other, each said bag having upper and lower ends and opposite sides, opposed spaced flanges connected to the outer surface of said tube longitudinally thereof, two pairs of spaced radial arms, each pair connected to the outer surface of said tube on opposite sides thereof between said flanges, a pair of retainer members each having vertically extending legs and arcuately shaped end portions connecting said legs, said retainer members each being positioned longitudinally of said tube with said end portions thereof positioned within said opposed flanges and said vertical legs disposed within a pair of said radial arms and adjacent thereto, the ends of said bladders being clamped and secured in closed position between said flanges and said end portions of said retainer members, and the sides of each of said bladders being clamped and secured in closed position between a pair of said radial members and the adjacent vertical legs of one of said retainer members, ports in said tube communicating with the interior of each of said bladders, a removable standing valve closing the lower end of said tube, said bladders being expandable into pressure contact with separate spaced peripheral portions of the wall of said bore by passage of fluid down said tube and into said bladders, and adapted to leave a space between said bags and between the external wall of said tube and said well bore for free passage of fluid in said space.

References Cited in the file of this patent

UNITED STATES PATENTS

| | | |
|---|---|---|
| Re. 23,733 | Farris | Nov. 10, 1953 |
| 1,630,470 | Clifford | May 31, 1927 |
| 2,346,677 | Hair et al. | Apr. 18, 1944 |
| 2,687,179 | Dismukes | Aug. 24, 1954 |
| 2,798,557 | Sewell | July 9, 1957 |

FOREIGN PATENTS

| | | |
|---|---|---|
| 111,689 | Australia | Oct. 3, 1940 |